Feb. 23, 1943.                K. MILLER                2,311,679
                               CLUTCH
                          Filed July 14, 1941
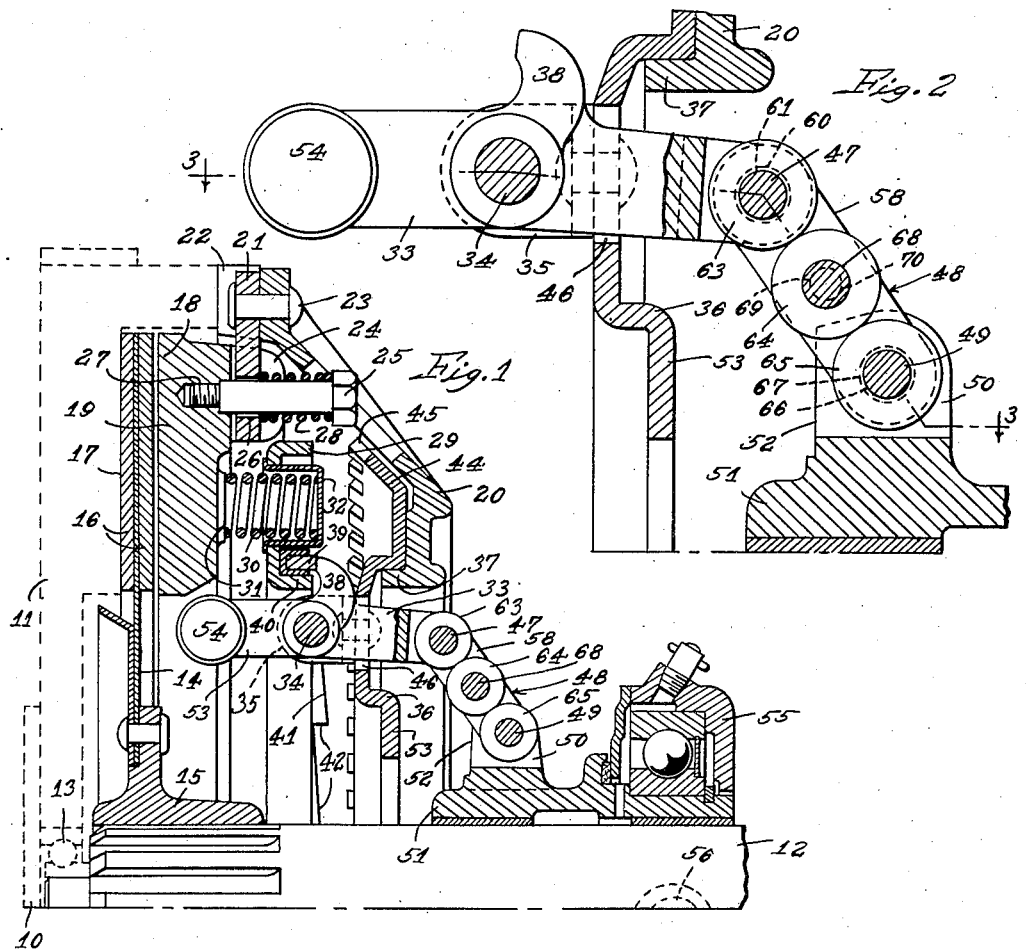
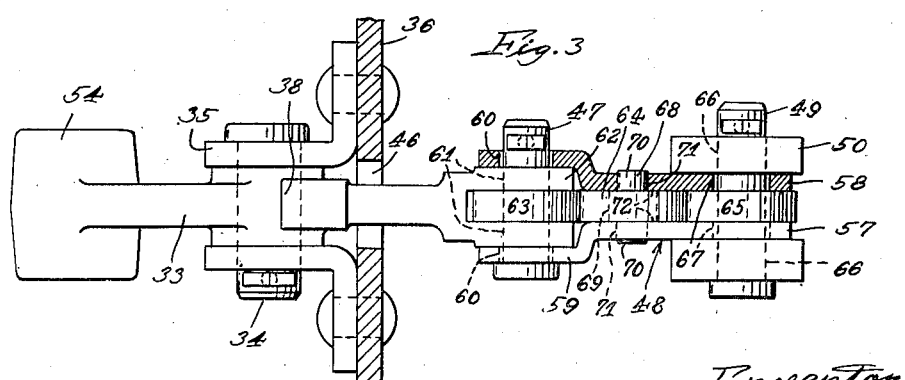
Inventor:
Kay Miller
By
McCanna, Wintercorn & Morsbach
Attys.

Patented Feb. 23, 1943

2,311,679

UNITED STATES PATENT OFFICE 2,311,679

CLUTCH

Kay Miller, Rockford, Ill., assignor to The Atwood Vacuum Machine Company, Rockford, Ill., a copartnership composed of Seth B. Atwood and James T. Atwood Application July 14, 1941, Serial No. 402,266

19 Claims. (Cl. 192—68)

This invention relates to friction clutches generally and is particularly concerned with over-center clutches suitable for tractors and other heavy duty purposes, the present invention dealing more particularly in improvements in clutches of the type disclosed in my copending application, Serial No. 388,283, filed April 12, 1941.

The principal object of my invention is to provide an improved anti-friction type over-center engaging means for clutches of the kind mentioned.

Another object consists in the embodiment of anti-friction rollers in the links that connect the throw-out collar with the clutch actuating levers, so that no other alteration of the clutch construction is necessary and anti-friction operation is obtained at minimum increase in the cost of the clutch, the anti-friction roller link being of a simple and relatively inexpensive construction.

The invention is illustrated in the accompanying drawing, in which—

Figure 1 is a fragmentary longitudinal section through a clutch equipped with anti-friction roller links made in accordance with my invention;

Fig. 2 is an enlarged view of a portion of the structure of Fig. 1; and

Fig. 3 is a view partly in elevation and partly in section on the broken line 3—3 of Fig. 2.

The same reference numerals are applied to corresponding parts in these views.

Referring first to Fig. 1, the end portion of the crank-shaft of the engine is indicated in dotted lines at 10 and the flywheel at 11. 12 is the driven shaft extending rearwardly from the flywheel and clutch into the gear box of the transmission in the usual way. This shaft has the usual pilot bearing at 13 supporting the front end thereof at the center of the flywheel. 14 is the clutch disk, the center hub 15 of which is splined on the front end of the shaft 12 to transmit drive from the flywheel to the shaft when the clutch is engaged. The usual pads or facings 16 on the clutch disk are engageable with the driving face 17 on the flywheel and the companion driving face 18 on the pressure plate 19. The latter is suitably cast like the flywheel, the faces 17 and 18 being accurately machined to insure smooth clutch engagement. The back plate 20 is also a casting and is arranged to be bolted to the rim of the flywheel. Small rectangular plates 21, fitting in radial grooves 22 in the rim of the back plate, are secured in place by rivets 23 and have a working fit in radial grooves 24 in the rim portion of the pressure plate 19 to drive the pressure plate with the flywheel, while allowing axial movement of the pressure plate relative to the flywheel, as required in the engagement and disengagement of the clutch. Bolts 25 are entered freely through holes 26 in the plates 21 and threaded in holes 27 in the pressure plate to provide mountings for coiled compression springs 28 acting between the plates 21 and the heads of the bolts 25, as shown, to urge the pressure plate normally away from the flywheel and clutch disk to retracted disengaged position.

A sheet metal ring 29 is mounted on the back of the pressure plate 19 on a plurality of screws (not shown) for limited axial movement with respect to the pressure plate, whereby to compress coiled compression springs 30, which are also provided in circumferentially spaced relation with respect to the back of the pressure plate, the springs engaging seats 31 on the pressure plate at one end and being received at their other ends in stamped sheet metal cups 32 entered in holes provided therefor in the web portion of the ring 29. These springs are preloaded, as described in my earlier aforementioned application, but are subjected to further compression in the engagement of the clutch, the increased spring pressure being therefore effective to hold the clutch disk 14 engaged between the flywheel and pressure plate. Further compression is obtained by movement of the ring 29 toward the pressure plate while the pressure plate is engaging the clutch plate, such movement being given the ring in the engagement of the clutch by clutch actuating bell-crank levers, one of which is shown at 33. These levers are provided in equally circumferentially spaced relation with respect to the back plate 20, and are pivoted, as at 34, on ears 35 provided on a sheet metal ring 36 that is rotatably mounted on an annular flange 37 provided on the inner side of the back plate in concentric relation to the flywheel and pressure plate. The ring 36 is therefore supported in concentric relation to the ring 29, so that proper relationship is established between the finger projections 38 on the intermediate pivot portions of the levers 33 and cam means 39 extending circumferentially with respect to the inner flange 40 of the ring 29, this being important because the ring 36 is arranged to be adjusted rotatively relative to the back plate to adjust the finger portions 38 of the levers 33 relative to the inclined helical cam surfaces 41 on the correlated arcuate segments 42 of the circumferentially extending cam means 39 to compensate for wear on the clutch disk facings 16. The ring 36 has an inner annular flange 43 for reinforcement and an outer annular flange 44, which also lends strength and rigidity to the ring. However, the edge of the flange 44 is notched, as indicated at 45, to permit using a screw driver or other tool to turn the ring 36 in the adjustment of the clutch. A gear (not shown) meshes with the notched edge 45, as described in my earlier application, and is arranged to be clamped so as to lock the ring 36 in adjusted position. The levers 33 provide rearwardly extending actuating arms which project through slots 46 in the ring 36 for pivotal connection at 47 with toggle links 48, which, in turn, are pivotally connected at 49 with lugs 50 on a throw-out collar 51. The flat surface 52 on the front of each lug 50 serves by engagement with the edge of the inner flange 43 on the ring 36 to limit the forward movement of the throw-out collar in the engagement of the clutch when the pivots 49 have moved past a plane through the pivots 47 normal to the shaft 12; in other words, when the toggle links 48 for operating the levers 33 have been moved "over center." Each of the levers 33 has an arm 53 extending forwardly from the pivot portion of the lever and enlarged at the outer end, as indicated at 54, to serve as a counterweight, the centrifugal force on which will balance the centrifugal force on the rear end portion of the lever and thus eliminate that as a factor in the operation of the clutch. The throw-out collar 51 is operable back and forth by means of a ring 55 provided with trunnions for cooperation with the usual yoke or other clutch operating means. The clutch structure thus far described conforms generally with the disclosure of my earlier copending application and no invention is therefore claimed in the details of this construction excepting only in so far as the same cooperate with or form a part or parts of the novel combination herein disclosed.

In operation, the springs 30 are preloaded to approximately 165 lbs., as described in my earlier application, and in the engagement of the clutch are compressed to exert at least 210 lbs. pressure on the clutch disk 14 through the pressure plate 19. It requires approximately .080″ travel to change the compression from the preload pressure of 165 lbs. to the engagement pressure of 210 lbs., and it follows therefore that a few thousandths of an inch wear on the clutch disk facings 16 will not be noticeable and cannot seriously affect the operation of the clutch. The clutch will operate satisfactorily with fairly coarse and infrequent adjustments.

In accordance with my invention, the links 48 are of two-piece, stamped, sheet metal construction, as clearly appears in Fig. 3, the pieces 57 and 58 of each link being bent apart so as to provide a forked end 59 to straddle the rear end of the associated clutch actuating lever 33. The registering holes 60 in the forked end of the link are purposely made a few thousandths of an inch oversize in diameter in relation to the registering holes 61 in the forked end 62 of the lever 33, so that the pivot pin 47 entered through the registering holes 60 and 61 fits relatively closely in the holes 61 and relatively loosely in the holes 60. The forked rear end of the lever 33 prior to this invention received therein the end of a link for a direct pivotal connection with the link, but in accordance with my invention a roller 63 is mounted with a working fit on the pin 47 for rotation in the forked rear end 62 of the lever 33. This roller has rolling contact with another roller 64 of the same diameter, and the roller 64, in turn, has rolling contact with a third roller 65 of the same diameter, the latter two rollers being mounted for free rotation between the parts 57 and 58 of the link 48. The pivot pin 49, similarly as the pin 47, has a relatively close fit in registering holes 66 in the lugs 50 on the throw-out collar 51 and has a relatively loose fit in the registering holes 67 in the link pieces 57 and 58, these latter holes being a few thousandths oversize. The roller 65 has a close working fit on the pin 49, similarly as in the case of the roller 63 on the pin 47. A bearing pin 68 is provided for the roller 64 and has an enlarged intermediate bearing portion 69 on which the roller 64 has a close working fit. The opposite ends of the pin 68 are of reduced diameter, as indicated at 70, in concentric relation with the intermediate portion 69 and have a close working fit in registering holes 71 provided therefor in the link pieces 57 and 58. The enlargement of the intermediate portion 69 of the pin 68 has a two-fold advantage: It enables the interchangeability of the rollers 63, 64, and 65, since the diameter of the portion 69 equals the diameter of the pins 47 and 49, and it results in the provision of annular shoulders 72 at the opposite ends of the intermediate bearing portion 69 for spacing the link pieces 57 and 58, so that close running clearance is assured between these pieces for the rollers 64 and 65, the portion 69 being a few thousandths larger in length than the thickness of the rollers 64 and 65 for that purpose. With this construction, rolling action is substituted for sliding action between the relatively movable parts of the over-center engaging means when the clutch is engaged or disengaged. When the throw-out collar 51 is moved forwardly for engagement of the clutch, the load incident to compression of the preloaded springs 30 by the levers 33 is assumed by the rollers 63, 64, and 65 substantially independently of the link pieces 57 and 58, the latter being in floating relation to the rollers and merely providing a cage to retain the rollers 64 and 65 in cooperative relation to one another and to the roller 63. There is, therefore, no tendency for any of the parts to bind, but instead the roller 64 turns through a certain angularity as it rides on the peripheries of the rollers 63 and 65 in the pivotal movement of the link 48 as a whole relative to the pivot pins 47 and 49. Due to the fact that the rollers 63, 64, and 65 are all of the same diameter, the rollers 63 and 65 will not turn about their pivot pins 47 and 49 as centers in the movement of the link 48; the roller 64 is the only one that turns and it turns through a small fraction of a turn in the movement of the link 48 from one extreme position to the other, so that wear upon the parts is accordingly reduced to a minimum. The load is so well distributed between the rollers 63, 64, and 65 that the unit bearing pressure is reduced to a very small fraction of what was obtained with other ordinary link constructions, thus further reducing wear and making for easier operation. The floating relationship of the link parts 57 and 58 to the rollers gives the rollers freedom to adjust themselves in relation to the link 48, so that they have proper bearing engagement upon one another and transmit load from one to the other substantially independently of the link, the latter merely acting as a retaining cage for the rollers.

It is believed the foregoing description conveys a good understanding of the objects and advantages of my invention. The appended claims have been drawn to cover all legitimate modifications and adaptations.

I claim:

1. In a friction clutch comprising a flywheel constituting the driving element, a clutch disk constituting the driven element, a back plate on the flywheel, and a pressure plate turning with the back plate and movable toward and away from the same in the disengagement and engagement of the clutch, respectively, positive over-center engaging means for said clutch, comprising one or more bell-crank levers pivotally mounted on one of the aforesaid plates and having a finger portion to engage the other of said plates, so that oscillatory movement of the lever forces the pressure plate away from the back plate to engage the clutch, said lever also having an actuating arm portion, a reciprocable throw-out collar, and a link device pivotally connected with the throw-out collar at one end and at the other end with the actuating arm portion of said lever to communicate oscillatory movement to the lever in the reciprocatory movement of the collar, said device including a fulcrum roller mounted on the actuating arm portion of the lever at the point of pivotal connection with the link, another fulcrum roller mounted on the throw-out collar at the point of pivotal connection with the link, said link having one end movable radially to a limited extent relative to one of said rollers, and another roller rotatably mounted on said link between the fulcrum rollers and having rolling contact on the peripheries thereof.

2. In a friction clutch comprising a flywheel constituting the driving element, a clutch disk constituting the driven element, a back plate on the flywheel, and a pressure plate turning with the back plate and movable toward and away from the same in the disengagement and engagement of the clutch, respectively, positive over-center engaging means for said clutch, comprising one or more bell-crank levers pivotally mounted on one of the aforesaid plates and having a finger portion to engage the other of said plates, so that oscillatory movement of the lever forces the pressure plate away from the back plate to engage the clutch, said lever also having a forked actuating arm portion, a reciprocable throw-out collar, and a link device pivotally connected with the throw-out collar at one end and having the other end forked and pivotally connected with the actuating arm portion of said lever to communicate oscillatory movement to the lever in the reciprocatory movement of the collar, said device including a fulcrum roller mounted in the forked actuating arm portion of the lever at the point of pivotal connection with the link, another fulcrum roller mounted on the throw-out collar at the point of pivotal connection with the link, said link having one end movable radially to a limited extent relative to one of said rollers, and another roller rotatably mounted on said link between the fulcrum rollers and having rolling contact on the peripheries thereof.

3. In a friction clutch comprising a flywheel constituting the driving element, a clutch disk constituting the driven element, a back plate on the flywheel, and a pressure plate turning with the back plate and movable toward and away from the same in the disengagement and engagement of the clutch, respectively, positive over-center engaging means for said clutch, comprising one or more bell-crank levers pivotally mounted on one of the aforesaid plates and having a finger portion to engage the other of said plates, so that oscillatory movement of the lever forces the pressure plate away from the back plate to engage the clutch, said lever also having a forked actuating arm portion, a reciprocable throw-out collar, and a link device pivotally connected at one end with the forked actuating arm portion of said lever and at the other end with the throw-out collar to communicate oscillatory movement to the lever in the reciprocatory movement of the collar, said link device comprising spaced side members straddling the forked actuating arm portion of said lever, said link device including a fulcrum roller mounted in the forked actuating arm portion of said lever at the point of pivotal connection with said link, another fulcrum roller mounted on the collar between the side members of said link at the point of pivotal connection of said link with said collar, the side members of said link having one end thereof movable to a limited extent radially relative to one of said rollers, and a pressure transmitting roller rotatably mounted between the side members of said link midway between the fulcrum rollers and having rolling contact with the peripheries thereof.

4. A clutch as set forth in claim 1, wherein the three rollers are all of the same diameter.

5. A clutch as set forth in claim 2, wherein the three rollers are all of the same diameter.

6. A clutch as set forth in claim 3, wherein the three rollers are all of the same diameter.

7. In a friction clutch, the combination with a flywheel constituting the driving element and a clutch disk constituting the driven element, of a back plate in fixed axially spaced relation to the flywheel, a pressure plate turning with the back plate and movable toward and away from the same in the disengagement and engagement of the clutch, respectively, and positive action over-center means for moving the pressure plate away from the back plate to engage the clutch, comprising one or more bell crank levers, a fulcrum for each of said levers on one of said plates, each of said levers having a finger portion to engage the other of said plates so as to transmit pressure to the pressure plate and having an actuating arm portion, a throw-out collar movable toward and away from the back plate, a roller rotatably mounted on the actuating arm portion of each of said levers, another roller rotatably mounted on the throw-out collar, at least one intermediate roller between the aforesaid rollers having rolling contact on the peripheries thereof, and ink means pivotally connecting the throw-out collar with the attaching portion of each of said levers and rotatably supporting the intermediate roller means, said intermediate roller means cooperating by rolling engagement with the other rollers to transmit the load from the first mentioned rollers to the second mentioned rollers, substantially independently of the link means in the engagement and disengagement of the clutch.

8. In a friction clutch, the combination with a flywheel constituting the driving element and a clutch disk constituting the driven element, of a back plate in fixed axially spaced relation to the flywheel, a pressure plate turning with the back plate and movable toward and away from the same in the disengagement and engagement of the clutch, respectively, and positive action over-center means for moving the pressure plate away from the back plate to engage the clutch, comprising one or more bell crank levers, a fulcrum for each of said levers on one of said plates, each of said levers having a finger portion to engage the other of said plates so as to transmit pressure to the pressure plate and having a forked actuating arm portion, a throw-out collar movable toward and away from the back plate and having a forked portion, a roller rotatably mounted in the forked actuating arm portion of the aforesaid lever, another roller rotatably mounted in the forked portion of the throw-out collar, at least one intermediate roller between the aforesaid rollers having rolling contact on the peripheries thereof, and link means pivotally connecting the forked portions of the throwout collar and aforesaid lever and rotatably supporting the intermediate roller means, said intermediate roller means cooperating by rolling engagement with the other rollers to transmit the load from the first mentioned roller to the second mentioned roller substantially independently of the link means in the engagement and disengagement of the clutch.

9. A clutch as set forth in claim 7, wherein all of said rollers are of the same diameter.

10. A clutch as set forth in claim 8, wherein all of said rollers are of the same diameter.

11. In a friction clutch comprising a flywheel constituting the driving element, a clutch disk constituting the driven element, a back plate on the flywheel, and a pressure plate turning with the back plate and movable toward and away from the same in the disengagement and engagement of the clutch, respectively, positive over-center engaging means for said clutch, comprising one or more bell-crank levers pivotally mounted on one of the aforesaid plates and having a finger portion to engage the other of said plates, so that oscillatory movement of the lever forces the pressure plate away from the back plate to engage the clutch, said lever also having an actuating arm portion, a reciprocable throw-out collar, and a link device pivotally connected with the throw-out collar at one end and at the other end with the actuating arm portion of said lever to communicate oscillatory movement to the lever in the reciprocatory movement of the collar, said device including a fulcrum roller mounted on the actuating arm portion of the lever at the point of pivotal connection with the link, another fulcrum roller mounted on the throw-out collar at the point of pivotal connection with the link, said link having its ends movable radially to a limited extent relative to said rollers, and another roller rotatably mounted on said link between the fulcrum rollers substantially without freedom for radial movement with respect to said link and having rolling contact on the peripheries of the fulcrum rollers.

12. In a friction clutch comprising a flywheel constituting the driving element, a clutch disk constituting the driven element, a back plate on the flywheel, and a pressure plate turning with the back plate and movable toward and away from the same in the disengagement and engagement of the clutch, respectively, positive over-center engaging means for said clutch, comprising one or more bell-crank levers pivotally mounted on one of the aforesaid plates and having a finger portion to engage the other of said plates, so that oscillatory movement of the lever forces the pressure plate away from the back plate to engage the clutch, said lever also having a forked actuating arm portion, a reciprocable throw-out collar, and a link device pivotally connected with the throw-out collar at one end and having the other end forked and pivotally connected with the actuating arm portion of said lever to communicate oscillatory movement to the lever in the reciprocatory movement of the collar, said device including a fulcrum roller mounted in the forked actuating arm portion of the lever at the point of pivotal connection with the link, another fulcrum roller mounted on the throw-out collar at the point of pivotal connection with the link, said link having its ends movable radially to a limited extent relative to said rollers, and another roller rotatably mounted on said link between the fulcrum rollers substantially without freedom for radial movement with respect to said link and having rolling contact on the peripheries of the fulcrum rollers.

13. In a friction clutch comprising a flywheel constituting the driving element, a clutch disk constituting the driven element, a back plate on the flywheel, and a pressure plate turning with the back plate and movable toward and away from the same in the disengagement and engagement of the clutch, respectively, positive over-center engaging means for said clutch, comprising one or more bell-crank levers pivotally mounted on one of the aforesaid plates and having a finger portion to engage the other of said plates, so that oscillatory movement of the lever forces the pressure plate away from the back plate to engage the clutch, said lever also having a forked actuating arm portion, a reciprocable throw-out collar, and a link device pivotally connected at one end with the forked actuating arm portion of said lever and at the other end with the throw-out collar to communicate oscillatory movement to the lever in the reciprocatory movement of the collar, said link device comprising spaced side members straddling the forked actuating arm portion of said lever, said link device including a fulcrum roller mounted in the forked actuating arm portion of said lever at the point of pivotal connection with said link, another fulcrum roller mounted on the collar between the side members of said link at the point of pivotal connection of said link with said collar, the side members of said link having the ends thereof movable to a limited extent radially relative to said rollers, and a pressure transmitting roller rotatably mounted between the side members of said link midway between the fulcrum rollers substantially without freedom for radial movement with respect to said link and having rolling contact with the peripheries of said fulcrum rollers.

14. A clutch as set forth in claim 11, wherein the three rollers are all of the same diameter.

15. A clutch as set forth in claim 12, wherein the three rollers are all of the same diameter.

16. A clutch as set forth in claim 13, wherein the three rollers are all of the same diameter.

17. As an article of manufacture an anti-friction thrust transmitting link, comprising an elongated link body and three rollers rotatably mounted on said link in a row with the peripheries thereof in rolling contact, the middle roller being mounted for rotation substantially without freedom for radial movement with respect to said link, and each of the end rollers having a pivot pin for rotatably mounting the same on said link with freedom to move radially to a limited extent relative to said link, said pivot pins providing means for pivotally connecting the link between an actuating means and an actuated means.

18. As an article of manufacture an anti-friction thrust transmitting link, comprising an elongated link body and three rollers rotatably mounted on said link in a row with the peripheries thereof in rolling contact, the middle roller being mounted for rotation substantially without freedom for radial movement with respect to said link, and each of said end rollers having a pivot pin for rotatably mounting the same on said link, said pivot pins providing means for pivotally connecting the link between an actuating means and an actuated means.

19. As an article of manufacture an anti-friction thrust transmitting link, comprising an elongated link body and three rollers rotatably mounted on said link in a row with the peripheries thereof in rolling contact, the middle roller being mounted for rotation substantially without freedom for radial movement with respect to said link, and each of said end rollers having a pivot pin for rotatably mounting the same on said link, said pivot pins providing means for pivotally connecting the link between an actuating means and an actuated means, one of said pivot pins being movable radially to a limited extent relative to said link to permit limited radial movement of the associated roller with respect to said link.

KAY MILLER.